United States Patent
Wiesneth et al.

(10) Patent No.: US 7,347,309 B2
(45) Date of Patent: Mar. 25, 2008

(54) DEVICE FOR AUXILIARY UNITS OF AN INTERNAL COMBUSTION ENGINE

(75) Inventors: Bernhard Wiesneth, Erlangen (DE); Harald Hochmuth, Hagenbüchach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 229 days.

(21) Appl. No.: 10/557,161

(22) PCT Filed: Apr. 16, 2004

(86) PCT No.: PCT/EP2004/004027

§ 371 (c)(1),
(2), (4) Date: Nov. 17, 2005

(87) PCT Pub. No.: WO2004/101973

PCT Pub. Date: Nov. 25, 2004

(65) Prior Publication Data

US 2006/0240926 A1    Oct. 26, 2006

(30) Foreign Application Priority Data

May 17, 2003    (DE) .................................. 103 22 230

(51) Int. Cl.
*F16D 47/04*    (2006.01)
*F16D 43/16*    (2006.01)
*F16D 41/064*   (2006.01)

(52) U.S. Cl. .................... 192/45; 192/48.6; 192/104 C

(58) Field of Classification Search ............... 192/48.3, 192/48.6, 104 C See application file for complete search history.

(56) References Cited

U.S. PATENT DOCUMENTS 2,163,080 A  *  6/1939  Benedek ....................... 91/492
5,517,957 A  *  5/1996  Wagner et al. ............ 123/192.1

FOREIGN PATENT DOCUMENTS

| DE | 920699 | 12/1954 |
| DE | 1 073 806 | 7/1960 |
| DE | 44 34 324 A1 | 4/1995 |
| DE | 195 11 188 A1 | 4/1996 |
| EP | 0 068 730 | 1/1983 |
| EP | 1 126 143 A2 | 8/2001 |
| GB | 2265191 A | 9/1993 |

* cited by examiner

*Primary Examiner*—Richard M. Lorence
*Assistant Examiner*—Edwin A Young
(74) *Attorney, Agent, or Firm*—Lucas & Mercanti, LLP

(57) ABSTRACT

In a device for damping rotary oscillations in a traction mechanism drive for auxiliary units of an internal combustion engine, having an overrunning clutch (27), which is arranged between a pulley (25) and a hub (26), according to the invention a locking device (33) is located between the pulley (25) and the hub (26), axially behind the overrunning clutch (27). This locking device includes an inner ring (34), which surrounds and is secured to the hub (26), and outer ring (35), which surrounds the inner ring (34) with a radial clearance and is secured to the pulley (25), and a plurality of retaining balls (36) which, together with compression springs (37), are arranged in radial bores (39) in the outer ring (35).

5 Claims, 2 Drawing Sheets

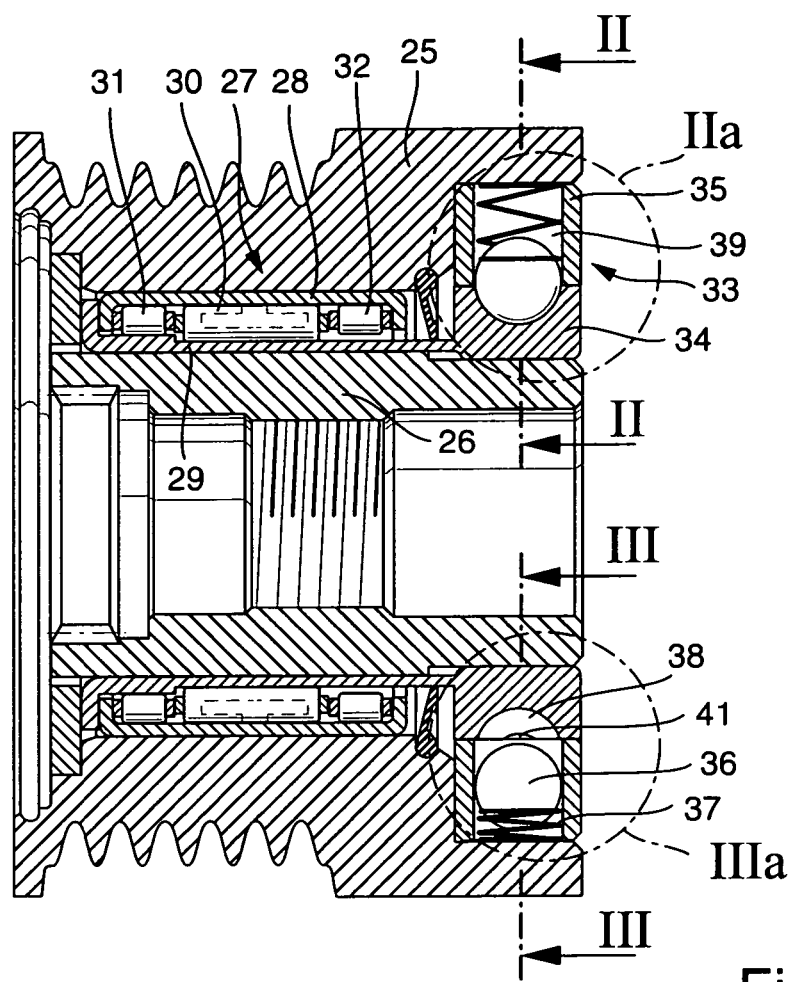
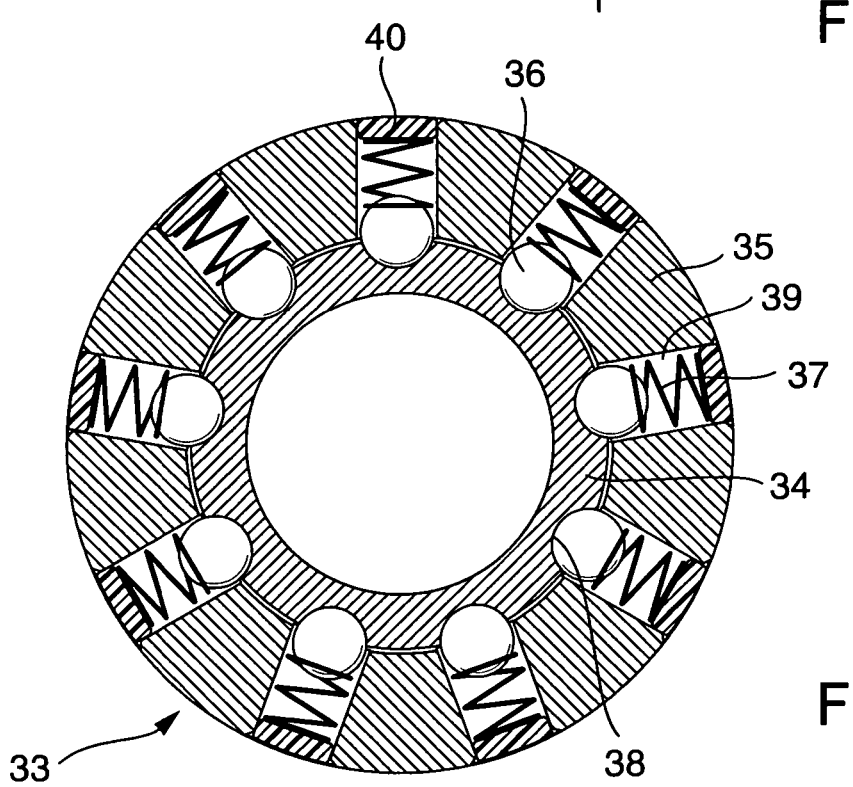
Fig. 1
Fig. 2

DEVICE FOR AUXILIARY UNITS OF AN INTERNAL COMBUSTION ENGINE

FIELD OF THE INVENTION

The invention relates to a device for damping rotary oscillations in a traction mechanism drive for auxiliary units of an internal combustion engine, having an overrunning clutch, which is arranged between a pulley and a hub that is rotationally fixedly connected to an input shaft of an auxiliary unit.

BACKGROUND OF THE INVENTION

On account of the increase in efforts of the automotive industry to reduce average fuel consumption, by way of example a belt-driven starter-generator is used in an internal combustion engine. This new technology is preferably used in combination with direct injection gasoline or diesel engines. On account of the unfavorable power train dynamics of these engines, there is an obvious desire for it to be possible to use a traction mechanism drive with an overrunning alternator pulley (OAP). In this context, it is intended to make use of the tried-and-tested operation of an overrunning alternator. An overrun of this type combined with a pulley is known, for example, from document DE 195 11 188 A1.

SUMMARY OF THE INVENTION

The invention is based on the object of allowing the internal combustion engine to be started using the generator. For this purpose, a starting mechanism which, after a starting operation, automatically decouples the starting function from the pulley as a function of the engine speed, is to be integrated in the overrunning alternator pulley.

According to the invention, this object is achieved by virtue of the fact that a locking device, which includes an inner ring that surrounds and is secured to the hub, an outer ring that surrounds the inner ring with a radial clearance and is secured to the pulley, and a plurality of retaining balls that are arranged together with compression springs in radial bores in the outer ring, are pressed toward the inner ring by the compression springs and are radially supported against the inner ring within spherical caps machined into the inner ring, is arranged between the pulley and the hub, axially behind the overrunning clutch.

This results in locking between the pulley and the hub, which is connected to the input shaft of the generator, when stationary and at low engine speeds, so that the generator auxiliary unit can be used as a starter. At higher engine speeds, the retaining balls leave the spherical caps of the inner ring as a result of centrifugal forces and release the inner ring and the hub connected to it from the pulley. In this case, only the overrunning clutch acts between the hub and the pulley, and the auxiliary unit can be used as a generator. The invention therefore makes it possible to use a starter-generator in the belt drive of an internal combustion engine.

To ensure reliable operation of the locking device, the radial bores and the spherical caps aligned with them, on the outer ring and the inner ring, respectively, may be arranged in succession at regular intervals in the circumferential direction, while the inner ring may be provided with an encircling guide groove, which is arranged between the individual spherical caps, with run-in ramps for the retaining balls.

The overrunning clutch may have a bearing outer ring or bearing inner ring, which is produced by a chipless process as a sheet-metal part and on which clamping ramps that interact with clamping rolls are formed, the bearing outer ring or bearing inner ring, at least on one side, extending axially beyond the region of the clamping ramps and forming a raceway for a rolling-contact bearing. The use of the same components for the overrunning clutch and for the rolling-contact bearing arrangement, i.e. the formation of a common bearing inner ring or bearing outer ring, allows the device to be of inexpensive design.

The assembly comprising the overrunning clutch, the rolling-contact bearings and the locking device with the inner ring, the outer ring, the retaining balls and the compression springs may be arranged within the axial extent of the pulley. This means that no additional space which exceeds the axial length of the pulley is required for the device according to the invention.

BRIEF DESCRIPTION OF THE DRAWING

An exemplary embodiment of the invention is illustrated in the drawing and described in more detail below by comparison with a device according to the known prior art. In the drawing:

FIG. 1 shows a pulley assembly according to the invention, which is provided with a locking device, in longitudinal section;

FIG. 2 shows the locking device in the locked position corresponding to circle IIa in a cross section on line II-II from FIG. 1;

DETAILED DESCRIPTION OF THE INVENTION

Figure 4:
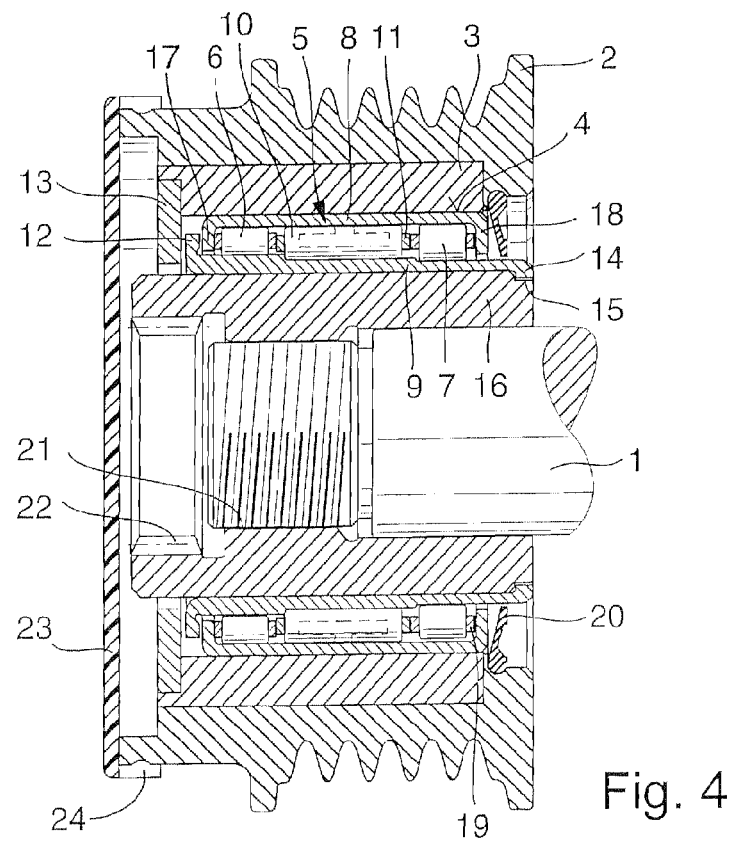
FIG. 4 shows a pulley assembly according to the known prior art.

A known device for damping rotary oscillations which is illustrated in FIG. 4 surrounds an input shaft 1 which, for example, forms part of an alternating-current generator or an air-conditioning compressor. The input shaft is driven via a pulley 2 and a drive belt (not shown in more detail) by an output disc connected to the crankshaft of an internal combustion engine. In its interior, the pulley 2 has a reinforcing ring 3. An assembly comprising an overrunning clutch 5 and two cylindrical-roller bearings 6 and 7 is placed in a bore 4 in this ring. In this arrangement, a common bearing outer ring 8 and a common bearing inner ring 9 are provided for the assembly. The bearing inner ring 9 has a plurality of clamping ramps which are distributed over the circumference, are not illustrated in more detail and interact with a corresponding number of clamping rolls 10. The clamping rolls are guided in a cage 11 and prestressed with respect to the clamping ramps by means of springs (not shown in more detail). The bearing outer ring 8 is designed substantially in the form of a sleeve and has a constant internal diameter over its entire length, forming raceways for the cylindrical-roller bearings 6 and 7 and the clamping rolls 10.

At its end remote from the auxiliary unit, the bearing inner ring 9 is provided with a radially outwardly directed flange 12 which at the end side is supported against a stop disc 13 fixed in the reinforcing ring 3. At its other axial end, the bearing inner ring 9 has a shoulder 14 which is designed, for example, in the form of a tooth and engages in individual longitudinal grooves 15, which in turn form part of a hub 16. At one end, the bearing outer ring 8 has a first flange 17, behind which the flange 12 of the bearing inner ring 9 engages. A second flange 18 of the bearing outer ring 8, which is provided at its end facing the auxiliary unit, engages behind a cage 19 of the cylindrical-roller bearing 7. A radial sealing ring 20, which is fitted into the pulley 2 and forms a sliding seal with the bearing inner ring 9, is arranged adjacent to this second flange 18. To secure the hub 16 to the input shaft 1, the hub 16 has an internal screw thread 21, a multi-tooth profile 22, which is designed as serrated toothing for an assembly tool to engage on, being provided in the interior of the hub 16 at a distance from this internal screw thread 21. At its end remote from the auxiliary unit, the pulley 2 is closed off by means of a cover 23 which has an axially projecting edge 24. The latter is snapped in at the circumference of the pulley 2.

Figure 3:
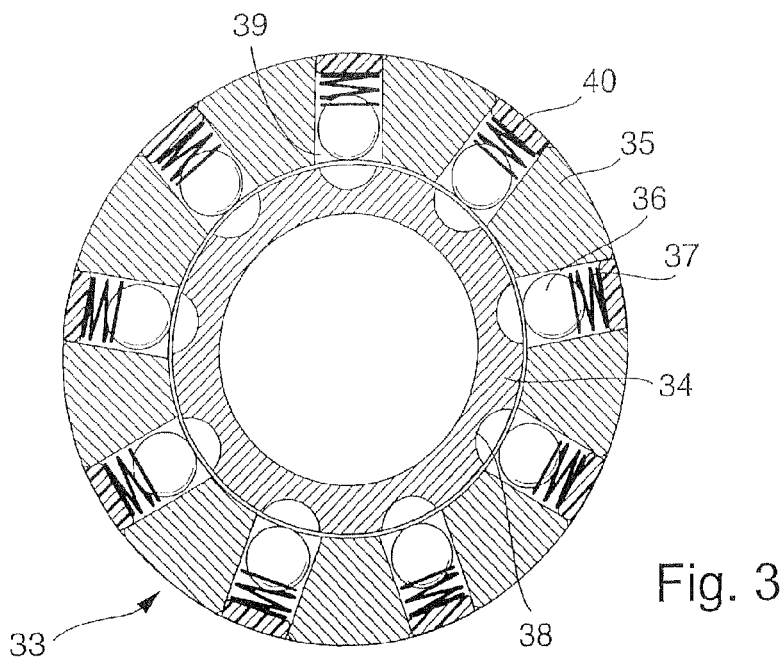
FIG. 3 shows the locking device in the unlocked position corresponding to circle IIIA in a cross section on line III-III from FIG. 1.

A device according to the invention illustrated in FIGS. 1 to 3 is of substantially the same construction as the device illustrated in FIG. 4. However, it differs from the latter by virtue of the fact that, in addition to the assembly comprising an overrunning clutch 27 with a bearing outer ring 28, a bearing inner ring 29, clamping rolls 30 and rolling-contact bearings 31 and 32, a locking device 33 is arranged between its pulley 25 and its hub 26. This locking device 33 comprises an inner ring 34, an outer ring 35, retaining balls 36 and compression springs 37.

The inner ring 34 has been fitted onto the hub 26 from its end and fixedly connected thereto. It includes a plurality of recesses leading from its outer surface in the form of spherical caps 38 which are arranged successively at regular intervals in the circumferential direction. The outer ring 35 concentrically surrounds the inner ring 34 with a radial clearance. It is inserted in an annular concentric recess of the pulley 25 from an end side and secured to the pulley. A continuous radial bore 39 is in each case arranged in the outer ring 35, coaxially with respect to a spherical cap 38 of the inner ring 34, and a retaining ball 36 and a compression spring 37 are fitted into this radial bore 39.

The radial bores 39 in the outer ring 35 can be closed off at the outer surface of the outer ring 35 using plugs 40, on which one end of the compression springs 37 is in each case supported. The respective other ends of the compression springs 37 bear against the inserted retaining balls 36 and press them into the spherical caps 38 of the inner ring 34. In the at-rest state of the device, the retaining balls 36 are each positioned approximately half in the spherical caps 38 of the inner ring 34 and approximately half in the radial bores 39 in the outer ring 35. They bridge the radial clearance between the inner ring 34 and the outer ring 35 and in this position retain the rings with respect to one another. In the operating state, the retaining balls 36, under centrifugal force, are pressed into the radial bores 39 to a greater or lesser extent depending on the rotational speed of the device, counter to the action of the compression springs 37, so that as a result the rings 34 and 35 are unlocked from one another.

The device according to the invention operates as follows: while the internal combustion engine is starting up, a torque is introduced from the starter-generator shaft via the hub 26 into the inner ring provided with the spherical caps 38. This starting torque is transmitted by means of the spherical caps 38 and the retaining balls 36 to the outer ring 35, which is positioned in a positively locking manner in the pulley 25 and acts as a ball support. The internal combustion engine is started by means of a drive belt surrounding the pulley 25.

After a limit rotational speed has been reached, the retaining balls 36, as a result of the centrifugal force, move completely into the radial bores 39 in the outer ring 35, counter to the action of the compression springs 37, and are thereby disengaged from the inner ring 34. The over-running pulley 25 is then decoupled from the generator mass and can perform its normal function. After the internal combustion engine has been switched off, and as a result the rotational speed has dropped back below the limit rotational speed, the retaining balls 36 move back into the locking position or engine starting position under the action of the prestressed compression springs 37. This engine starting position is found automatically. To achieve this in a defined way, the inner ring 34 has a radially encircling guide groove 41 with run-in ramps which are arranged between the individual spherical caps 38 of the inner ring 34.

| | |
|---|---|
| 1 | Input shaft |
| 2 | Pulley |
| 3 | Reinforcing ring |
| 4 | Bore |
| 5 | Overrunning clutch |
| 6 | Cylindrical-roller bearing |
| 7 | Cylindrical-roller bearing |
| 8 | Bearing outer ring |
| 9 | Bearing inner ring |
| 10 | Clamping roll |
| 11 | Cage |
| 12 | Flange |
| 13 | Stop disc |
| 14 | Shoulder |
| 15 | Longitudinal groove |
| 16 | Hub |
| 17 | First flange |
| 18 | Second flange |
| 19 | Cage |
| 20 | Radial sealing ring |
| 21 | Internal screw thread |
| 22 | Multi-toothed profile |
| 23 | Cover |
| 24 | Edge |
| 25 | Pulley |
| 26 | Hub |
| 27 | Overrunning clutch |
| 28 | Bearing outer ring |
| 29 | Bearing inner ring |
| 30 | Clamping roll |
| 31 | Rolling-contact bearing |
| 32 | Rolling-contact bearing |
| 33 | Locking device |
| 34 | Inner ring |
| 35 | Outer ring |
| 36 | Retaining ball |
| 37 | Compression spring |
| 38 | Spherical cap |
| 39 | Radial bore |
| 40 | Plug |
| 41 | Guide groove |

The invention claimed is:

1. Device for damping rotary oscillations in a traction mechanism drive for auxiliary units of an internal combustion engine, comprising:
   an overrunning clutch arranged between a pulley and a hub that is rotationally fixedly connected to an input shaft of an auxiliary unit,
   a locking device arranged between the pulley and the hub, axially behind the overrunning clutch, the locking device comprising an inner ring that surrounds and is secured to the hub, an outer ring that surrounds the inner ring with a radial clearance and is secured to the pulley, a plurality of retaining balls that are arranged together with compression springs in radial bores in the outer ring the balls are pressed toward the inner ring by the compression spring and are radially supported against the inner ring within spherical caps machined into the inner ring, and an encircling guide groove in the inner ring arranged between the individual spherical caps.

2. The device as claimed in claim 1, wherein the radial bores and the spherical caps are arranged in succession at regular intervals in the circumferential direction.

3. The device as claimed in claim 1, wherein the encircling guide groove has run-in ramps for the retaining balls.

4. The device as claimed in claim 1, wherein the overrunning clutch has a bearing outer ring or bearing inner ring, which is produced by a chipless process as a sheet metal part and on which clamping ramps that interact with clamping rolls are formed, the bearing route ring or bearing inner ring, at least on one side, extending axially beyond the region of the clamping rolls and forming a raceway for a rolling-contact bearing.

5. The device as claimed in claim 4, wherein the overrunning clutch, the rolling-contact bearings and the locking device are arranged axially within the pulley.

* * * * *